United States Patent [19]
Helgren

[11] Patent Number: 5,354,035
[45] Date of Patent: Oct. 11, 1994

[54] OBJECT ROTATING, LIFTING AND STORAGE SYSTEM

[76] Inventor: R. Hayes Helgren, 289 Banbury Rd., Mundelein, Ill. 60060

[21] Appl. No.: 911,948

[22] Filed: Jul. 10, 1992

Related U.S. Application Data

[63] Continuation-in-part of Ser. No. 590,765, Oct. 1, 1990, abandoned.

[51] Int. Cl.$^5$ .............................................. B66F 11/00
[52] U.S. Cl. ........................................ 254/399; 211/18; 224/42.03 B
[58] Field of Search ............... 254/399, 334, 335, 336, 254/337, 338, 398; 224/42.03 B; 211/18, 17

[56] References Cited

U.S. PATENT DOCUMENTS

| | | | |
|---|---|---|---|
| 332,231 | 12/1885 | Brown | 254/337 |
| 2,643,662 | 6/1953 | Bunce | 254/338 |
| 2,649,279 | 8/1953 | Jones et al. | 254/338 |
| 2,721,054 | 10/1955 | Lutton | 254/338 |
| 3,661,415 | 5/1972 | Piasecki | 254/337 |
| 3,924,751 | 12/1975 | Ballenger | 211/17 |
| 4,116,341 | 9/1978 | Hebda | 224/43.03 B |
| 4,400,129 | 8/1983 | Eisenberg | 224/43.03 B |
| 4,552,270 | 11/1985 | Lentz | 211/17 |
| 5,183,162 | 2/1993 | Ritzenthaler | 211/18 |

FOREIGN PATENT DOCUMENTS

| | | | |
|---|---|---|---|
| 130970 | 5/1901 | Fed. Rep. of Germany | 211/18 |
| 1548974 | 12/1968 | France | 254/337 |
| 17384 | 7/1898 | Switzerland | 211/18 |
| 2977 | 2/1897 | United Kingdom | 211/18 |
| 6433 | 2/1899 | United Kingdom | 211/18 |

Primary Examiner—Katherine Matecki
Attorney, Agent, or Firm—Alan R. Thiele

[57] ABSTRACT

A system for tilting and lifting a device includes three pulleys and a cable. A portion of the cable is adjustable. Two of the pulleys are connected to a stationary surface and the third pulley is connected to the object. One end of the cable is connected to the object and the other end provides for the application of force.

13 Claims, 4 Drawing Sheets

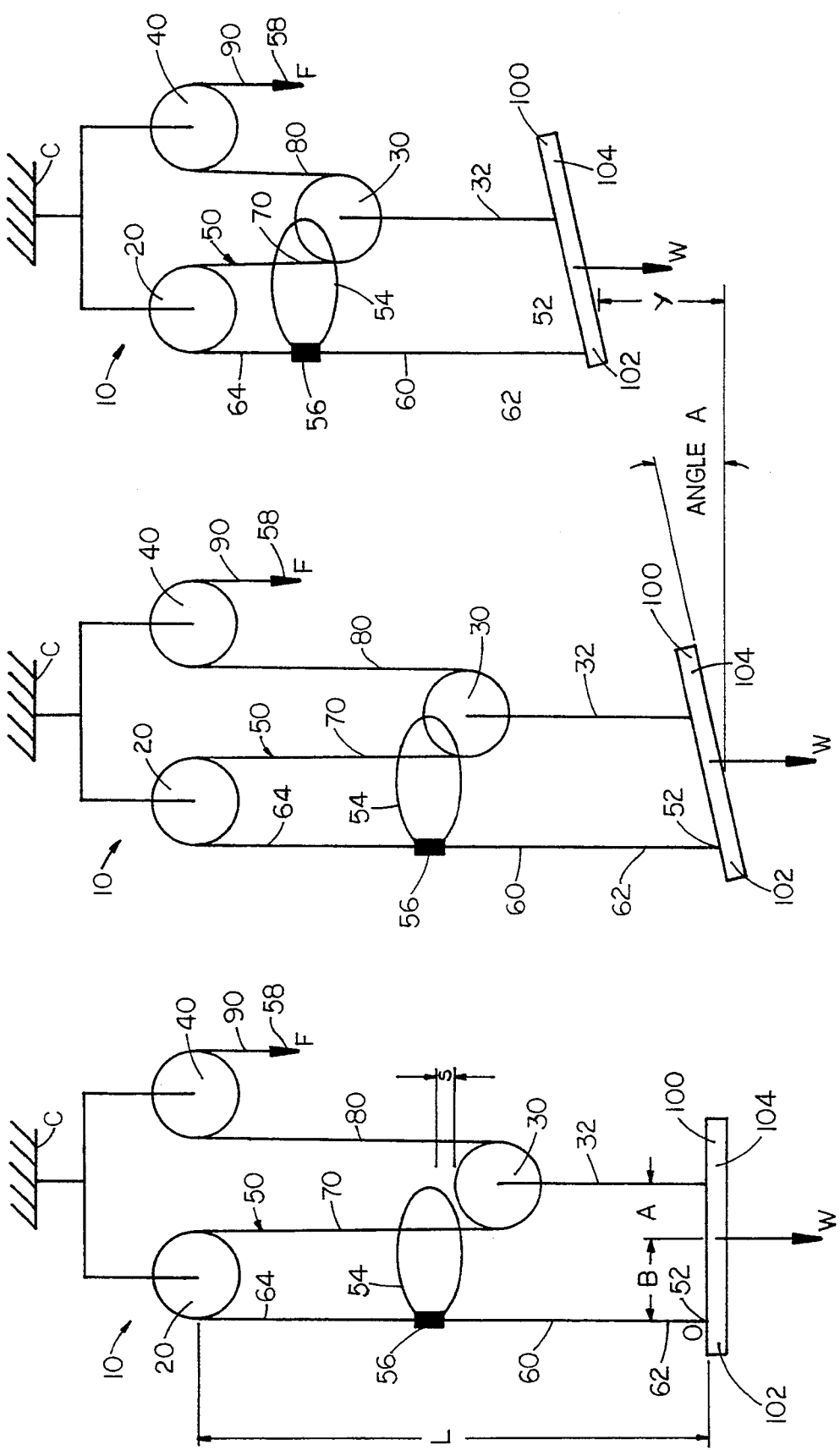

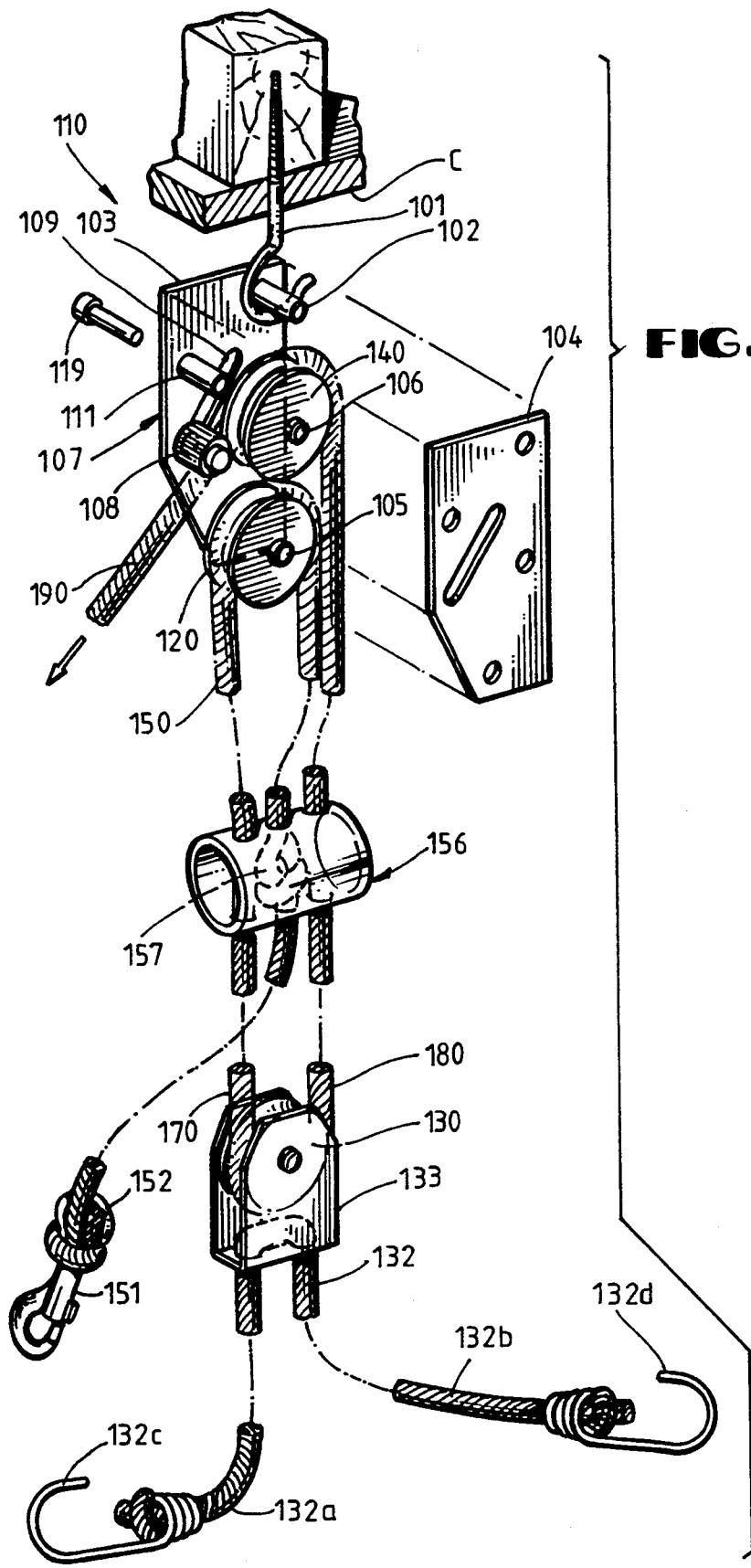
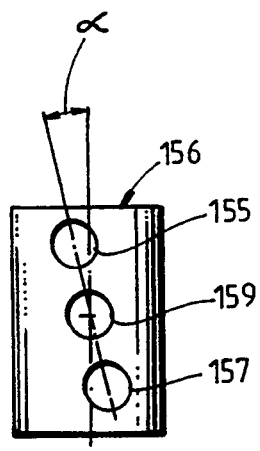
FIG. 11
FIG. 12 ns 5,354,035

OBJECT ROTATING, LIFTING AND STORAGE SYSTEM

BACKGROUND OF THE INVENTION

This is a continuation-in-part of U.S. patent application Ser. No. 07/590,765 filed Oct. 1, 1990 now abandoned.

The device and method of the present invention pertain to lifting systems; more particularly, the device and method of the present invention pertain to a pulley lifting system which first rotates the object to be lifted and then lifts the object in its rotated position.

When lifting or storing various objects, it is often necessary to rotate the object to be lifted into a configuration in which it may be conveniently stored. For ease of understanding the object rotating, lifting and storage system of the present invention, it will be explained in conjunction with a standard two wheel bicycle. Those of ordinary skill in the art will understand that other lifting needs may be met with the device of the present invention.

Many people who store two-wheeled bicycles hang their bicycles from hooks mounted overhead or on a wall. These hooks are spaced apart a sufficient distance to accommodate the wheels or the frame of the bicycle. This form of storage is inconvenient and possibly dangerous in that the full weight of the bicycle must be borne by the user when placing the bicycle into or removing the bicycle from storage. In some cases the user must not only lift the bicycle onto the hooks but must also turn the bicycle upside down to facilitate engagement with the hooks. For those with a tendency toward back injuries, such movements are dangerous.

Some situations necessitate that the user climb a ladder to store or remove the bicycle from its storage location. The use of a ladder adds instability problems and thus adds more danger to an already physically demanding task.

An inverted bicycle hanging from ceiling hooks encroaches on living space and provides an overhead hazard to users of the storage facility. As bicycles are often stored in poorly lighted spaces such as basements or garages the need to assure that the bicycle is out of an overhead space is critical. If the bicycle were caused to lay flat against the ceiling, such difficulties and hazards would be eliminated.

There is, therefore, a need in the art to provide an object rotating, lifting and storage system which first rotates and second lifts a bicycle so that it may be stored in its rotated position and thus be kept out of overhead space.

SUMMARY OF THE INVENTION

A system for first rotating and then lifting and storing a bicycle includes three pulleys and a rope. Two of the pulleys are affixed to a stationary surface. The third pulley and one end of the rope are affixed to the object. The free end of the rope provides for the application of force which first rotates and then lifts the bicycle to its stored position. That portion of the rope between the object and the first pulley is adjustable in length. It is the adjusted length of this portion of the rope that determines the amount of rotation which takes place before the bicycle is lifted to its storage position.

BRIEF DESCRIPTION OF THE DRAWINGS

A better understanding of the device and system for object rotating, lifting and storage system of the present invention may be had by reference to the drawings wherein:

FIG. 1 is a schematic depiction of the arrangement of the object rotating, lifting and storage system of the present invention;

FIG. 2 is a schematic view similar to FIG. 1 wherein the system of the present invention is rotating the object being lifted;

FIG. 3 is a schematic view similar to FIG. 1 wherein the system of the present invention is continuing to lift the object;

FIG. 11 is an exploded view of the lifting system of the present invention; and

FIG. 12 is a top view of the loom member.

DESCRIPTION OF THE EMBODIMENTS

Figure 7:
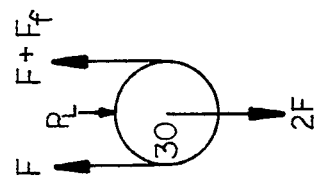
FIG. 7 is a schematic of all forces acting on the lowermost pulley as rotation begins.
Figure 8:
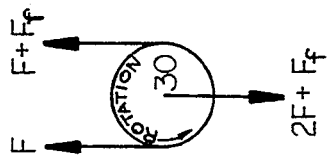
FIG. 8 is a schematic of all forces acting on the lowermost pulley at the instant that the rotation angle is achieved and initiation of vertical movement of the object to be lifted.
Figure 10:
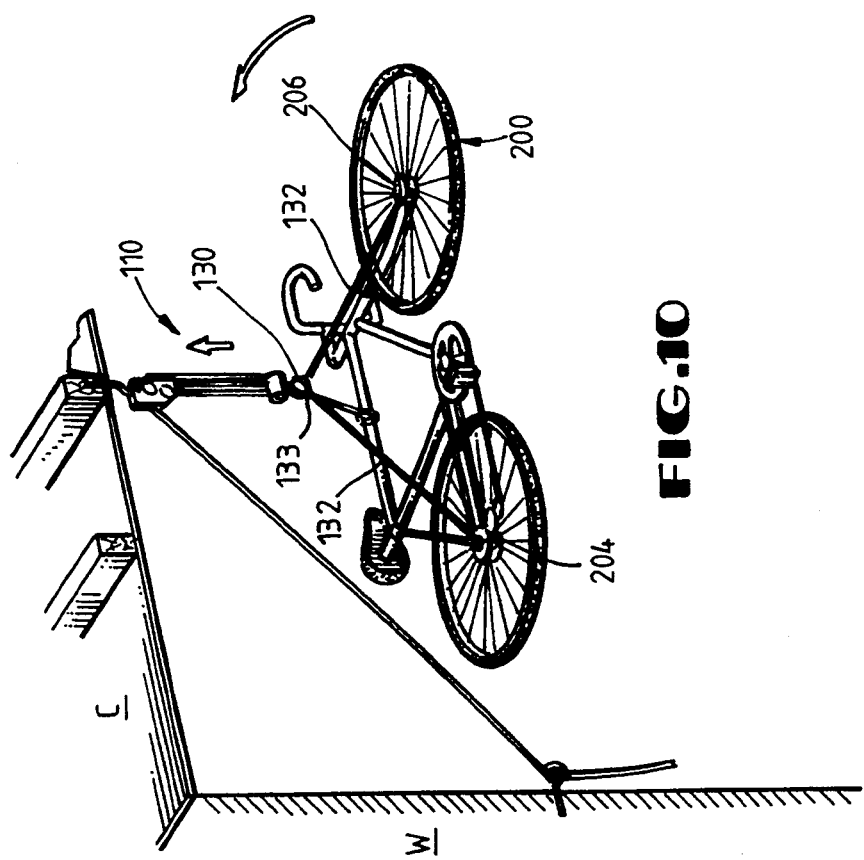
FIG. 10 is a perspective view of the system after the bicycle has been rotated from its vertical position.
Figure 9:
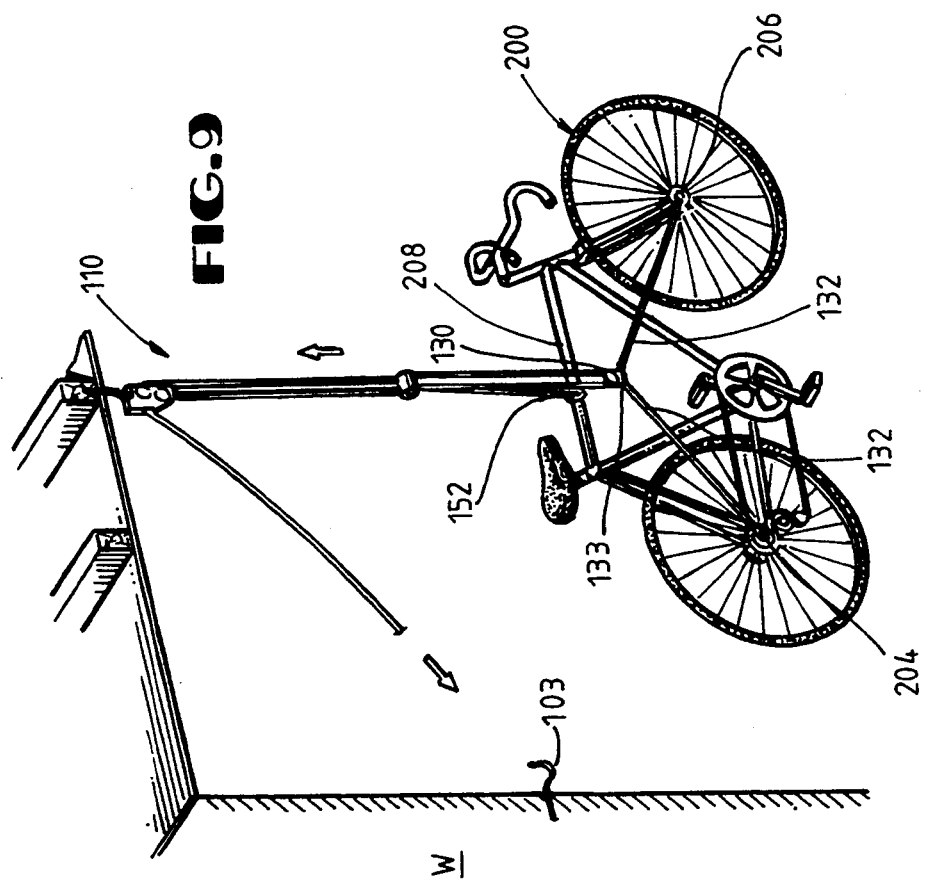
FIG. 9 is a perspective view of the system of the present invention mounted on a two-wheeled bicycle before the lifting process has begun.

FIGS. 1-8 schematically describe the theory of operation of the object rotating, lifting and storage system 10 of the present invention. FIGS. 9 and 10 show its application to lifting a two-wheeled bicycle and FIGS. 11 and 12 illustrate its construction. As previously stated, system 10 is illustrated in conjunction with a two-wheeled bicycle. Other applications will become apparent to those of ordinary skill in the art.

In FIGS. 1, 2 and 3, it will be seen that the device and system 10 of the present invention includes three pulleys 20, 30 and 40 and a rope or flexible cable segment 50. While a rope segment 50 is shown in the preferred embodiment, it will be understood by those of ordinary skill in the art that what is required is a flexible member capable of transmitting a tension force. Such flexible members might include wire, wire rope or chain. Pulleys 20 and 40 are affixed to or arranged to be in a fixed relation to an overhead stationary surface or ceiling C. One end 52 of cable member 50 is connected to object 100. Moving along the rope 50 away from object 100, FIG. 1 depicts a loop 54 formed with a friction stop member 56 located in rope 50. Friction stop member 56 is used to create or hold loop 54 which limits the amount of upward vertical travel of pulley 30.

Rope 50 exits friction stop member 56 then passes over first pulley 20. In the embodiment shown in FIG. 9 rope 50 passes through friction stop member 56 then continues on to second pulley 30. Second pulley 30 is attached by a cable or bracket 32 to object 100. Rope 50 passes around second pulley 30 and continues on to third pulley 40. Once rope 50 has passed around third pulley 40, the free end 58 of rope 50 allows for the application of force F.

For ease of understanding, rope segment 50 may be divided into four sections 60, 70, 80 and 90. First rope section 60 runs between object 100 and the first pulley 20. Second rope section 70 runs between first pulley 20 and second pulley 30; third rope section 80 runs between second pulley 30 and third pulley 40; and fourth rope section 90 runs between third pulley 40 and free end 58 of rope 50 on which force F is applied. Loop 54 is in first rope section 60 between first end portion 62 of first rope section 60 and second end portion 64 of first rope section 60. It is the position of loop 54 which determines how much object 100 is rotated before non-rotational lifting begins.

To further describe the attachment of second pulley 30 and rope 50 to object 100, it will be understood that rope 50 is attached to distal end 102 of object 100, and second pulley 30 is attached to proximal end 104 of object 100.

Operation

With specific reference to FIG. 1, it may be seen that object 100, having weight W, is supported by the rotating, lifting device and system 10 of the present invention. Friction stop member is adjustably fixed on first rope section 60 which runs from object 100 to first pulley member 20. In the initial or start position shown in FIG. 1, loom 56 adjusted such that loop 54 is separated from second pulley member 30 by distance "s". The proper setting of distance "s" by the positioning of loop 54 is critical as distance "s" determines the amount of rotation of object 100.

Figure 4:
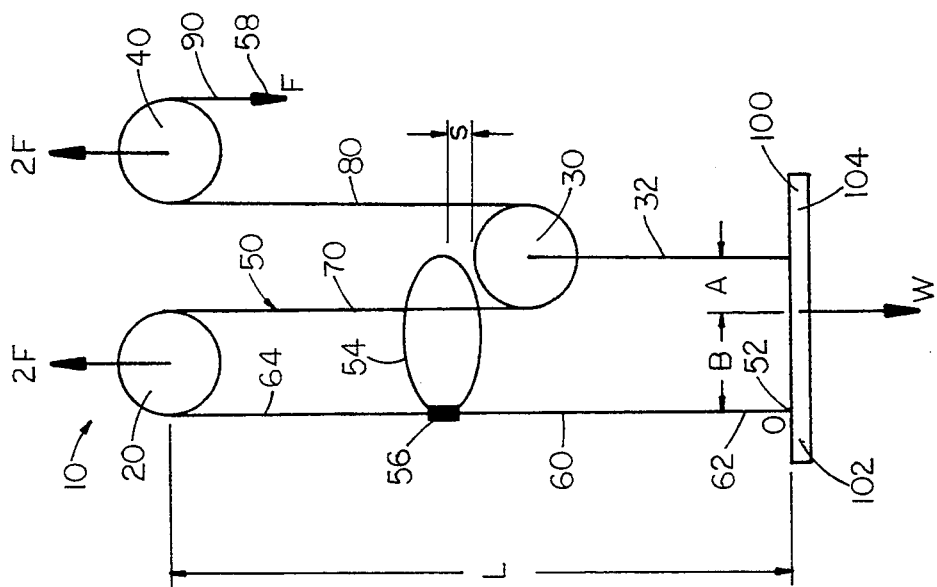
FIG. 4 is a schematic view similar to FIG. 1 wherein the reaction forces at the stationary surface attachment points are shown.

In order to calculate the force "F" required to maintain the system in balance refer to FIG. 4. The summation of all vertical forces external to the system yields:

$$W + F - 2(2F) = 0$$

$$F = W/3$$

Figure 5:
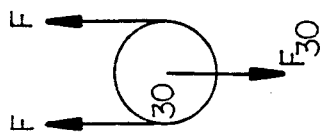
FIG. 5 is a schematic of all forces acting on the lowermost pulley while in equilibrium.

Likewise referring to FIG. 5, summing the external vertical forces about pulley 30 where $F_{30}$ is the force from pulley 30 on bracket or cable 32 then:

$$F_{30} = 2F$$

$$F_{30} = \tfrac{2}{3}W$$

Figure 6:
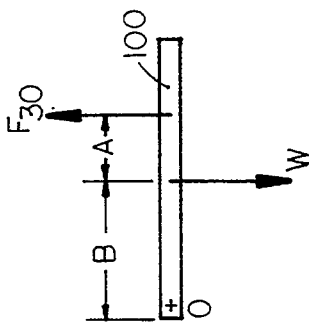
FIG. 6 is a schematic of the object to be lifted at equilibrium conditions.

Transmitting force $F_{30}$ down cable 32 and applying an equal and opposite force on object 100, FIG. 6, allows the following summation of moments about point 0 under equilibrium conditions:

$$WB - (F_{30})(A+B) = 0$$

$$WB - \tfrac{2}{3}WA - \tfrac{2}{3}WB = 0$$

$$\tfrac{1}{3}WB - \tfrac{2}{3}WA = 0$$

$$WB - 2WA = 0$$

$$B = 2A$$

Vertical and rotational equilibrium is assured if:

$$F = W/3$$

$$A = B/2$$

$$F_{30} = 2F = \tfrac{2}{3}W$$

Since frictional losses occur in all energy conversions, a Force $F_f$ must be exerted in addition to force F to overcome friction in pulley 30 to initiate rotation.

FIG. 7 shows the forces just as rotation of pulley 30 begins. Note that the reaction force transmitted down tension member 32 is increased by frictional force. Frictional losses between rope 50 and loop 54 in addition to frictional losses of pulley 20 have not yet been overcome by rope tension since the available force from pulley 30 is still F. Comparing vertical forces on attachment point 52 at equilibrium and after imparting $F > W/3 + \text{pulley}_{30+40}$ friction, it is found that no force changes occur and no vertical movement will result at attachment point 52. At the other attachment point to object 100, the force has increased from $F_{30} = 2F$ to $F_{30}' = 2F + F_f$ where $F_f$ represents the force to overcome friction. Force ($F_{30}'$) which acts on a lever arm of $A + B$ will cause rotation of object 100 about point 0.

Angle "A" formed between the bottom of object 100 and the horizontal will increase until further vertical movement (s) of pulley 30 is prohibited by contact with loop 54. At that point, no further rotation of object 100 can occur, thus the equilibrium equation about point 0 can now be used. This equation states that the force at the attachment point of cable 32 to object 100 must be returned to $F_{30} = 2F$. FIG. 8 shows pulley 30 being contacted by loop 54 in the "coupled" condition and exerting a force on it. Summing upward and downward forces yields:

$$P_L + 2F = F + (F + F_f)$$

$$P_L = F_f$$

Thus loop 54 exerts a force exactly equivalent to the frictional force on pulley 30. The equal and opposite force addition to rope 50 is then exerted at attachment point 52. This additional force causes vertical movement of attachment point 52 thus elevating the entire system until $F_f$ is returned to zero.

It can be seen by those skilled in the art that a similar analysis will reveal that when $F < W/3 + $ pulley friction, object 100 will first rotate back to its equilibrium position where angle "A" = 0° then descend while maintaining that angle. For purposes of illustration and explanation, the equilibrium position was chosen to be where angle "A" = 0°. It may be easily seen, however, by those skilled in the art that force factors, weight positions and attachment points can be adjusted such that various equilibrium angles can be achieved. For example, when lifting an object such as a two-wheeled bicycle it is necessary to rotate the bicycle from a substantially vertical to a substantially horizontal position. Despite whether the object to be lifted goes from the horizontal to the vertical, or vice-versa, the description of the operation is the same.

Exemplary Application to a Two-Wheeled Bicycle

As previously stated the principles involved in this invention have been reduced to practice for the case of storing a two-wheeled bicycle. The rotating, lifting and storage system 110 is attached to a bicycle while in its substantially upright, vertical position. As shown in FIG. 9, this occurs when the plane of the bicycle frame is substantially parallel with the direction of gravity.

When force "F" is applied to system 110, bicycle 200 is first rotated from a substantially vertical or upright position, such as when resting on its kickstand, to a substantially horizontal or laying on its side position. As shown in FIG. 10, this occurs when the plane of the bicycle frame is substantially perpendicular with the direction of gravity. Continued application of force "F" causes bicycle 200 to ascend to ceiling "C" for storage in its rotated or substantially horizontal position. It will be readily understood that while in such a substantially horizontal position a bicycle is less intrusive to a living or garage space than a bicycle hanging upside down from its wheels.

An illustration of the operation of the lifting system 110 of the present invention with a two-wheeled bicycle 200 may be seen in FIGS. 9 and 10. In FIG. 9 bicycle 200 is in its substantially vertical position as it is when resting on a kickstand (not shown). An attachment rope 132 having two branches 132a and 132b is attached near axles 204 and 206 of bicycle 200. Attachment rope 132 is connected by bracket 133 to pulley 130. The third point of contact with bicycle 200 is with end 152 of rope 150 on which is affixed clip 151. Rope 150 is wrapped around bar 208 and clip 151 hooked onto rope 150. Attachment of system 110 to ceiling C is by threaded hook 101 which engages with pin 102 located between plates 103 and 104.

In FIG. 10 force F has been exerted on rope 150. This causes bicycle 200 to be rotated to a substantially horizontal position then lifted in its substantially horizontal position to ceiling C. Note that in the preferred embodiment rope 150 has been tied off onto hook 103 fastened to wall W.

A further understanding of the operative characteristics of the lifting system 110 may be had by reference to FIG. 11. Therein it may been seen that cord 132 with its two branches 132a and 132b passes through bracket 133 which is formed around the outside of pulley 130. Pulley 130 is engaged by rope sections 170 and 180. Clip 151 is attached on the end 152 of rope 150. Note that once rope 150 departs clip 151 it passes into friction stop member assembly 156 wherein knot 157 is tied. From knot 157 rope 150 travels upward to pulley 120. Once passing over pulley 120 rope section 170 passes back through friction stop member assembly 156 and passes around pulley 130. After exiting pulley 130 rope section 180 passes back through friction stop member assembly 156 and around pulley 140. Once having traveled around pulley 140 rope 150 becomes rope section 190 on which a force is exerted in order to utilize the system 110.

Pulleys 120 and 140 are held in place by plates 103 and 104. Note that axles 105 and 106 allow pulleys 120 and 140 to rotate. Locking mechanism 107 allows for rope 150 to be locked in position much like the locking of a rope mechanism on an ordinary venetian blind. Herein roller 108 travels within slot 109 and traps rope 150 against pulley 140 when system 110 is not in use. Attachment of plates 103 and 104 together is accomplished by an ordinary fastener such as shown as 119. Such fasteners pass through guide pins 102 and 111 which also act as spacers setting a predetermined distance between plates 103 and 104.

A better understanding of the design and construction of friction stop member assembly 156 may be seen by reference to FIG. 12. Therein it will be seen that the center lines of hole pairs 155 and 157 are angularly disposed such that an angle X is created from the center line or long axis of friction stop member 156. This slight offset of the holes creates substantially more friction force at rope 170 passing through friction stop member 156 than at rope 180 passing through friction stop member 156. This preferential friction system enhances the sequential rotational movement that takes place before lifting of the bicycle as well as compensating for conditions where the center of gravity of the bicycle is not ideal.

Operation

The user of lifting system 110 places bicycle 200 on its kickstand underneath threaded hook 101. Cord 132 is then attached to axles 204 and 206 using hooks 132c and 132d. Clip 151 is passed around crossbar 208 and hooked onto rope 150. If desired an optional cord may be wrapped around the crossbar and the front wheel to prohibit rotation of the front forks when bicycle 200 is raised to its storage position.

The user raises bicycle 200 by exerting force F on rope section 190. This causes bicycle 200 to first rotate to a substantially horizontal position. Continued force on section 190 causes bicycle 200, in its horizontal position, to move toward ceiling C. Once the desired height of bicycle 200 has been achieved the rope is moved so that lock assembly 107 will lock cord 150 in an action similar to that of the lock found on many venetian blinds. Excess rope 150 is then coiled and stored on wall hook 103 after the rope 150 is affixed to wall hook 103.

To remove bicycle 200 from its storage position near ceiling C locking mechanism 107 is disengaged by removing rope 150 from wall hook 103 and applying a tension to the rope in nearly a vertical direction. Bicycle 200 is then free to descend under its own weight. Bicycle 200 will rotate to its vertical position then travel downwardly as the rope 150 is allowed to pass through pulleys 120, 130 and 140.

There has now been provided by the foregoing disclosure of the rotating, lifting and storage system of the present invention, through the example of a bicycle storage system a way of first rotating and then lifting an object for storage at a higher level.

While it is understood that the device and method of the present invention has been taught with regard to the preferred embodiment, other embodiments of the invention will become apparent to those of ordinary skill in the art by reference to the figures and specification. Such other embodiments shall be included in the scope of the appended claims.

I claim:

1. A system for first rotating and then lifting a bicycle to an overhead stationary surface, said system comprising:

a continuous rope segment having first, second, third and fourth sections;

first, second and third pulleys;

said continuous rope segment and said first, second, and third pulleys constructed and arranged to include:

said first rope section having a first end and a second end, said first end having means for connecting to the bicycle attached thereto;

means for altering the length of said first rope section located between said first and second ends;

said first pulley mounted to the overhead stationery surface and receiving the second end of said first rope section;

said second pulley positioned beneath said means for altering the length of said first rope section, said second pulley further including means to connect said second pulley to the bicycle;

said second rope section passing between said first pulley and said second pulley;

said third pulley located at substantially the same height as said first pulley, said third pulley being mounted to the overhead stationary surface;

said third rope section passing between said second and third pulleys;

a fourth rope section extending from said third pulley and constructed and arranged for the application of force;

whereby when a force is placed on said fourth rope section, so that said continuous rope segment is in tension, said second pulley moves upwardly until said second pulley is substantially even with said means for altering the length of said first rope section and said second pulley and said means for altering the length of said first rope section will then move upwardly at the same rate.

2. The system as defined in claim 1 wherein said means for altering the length of said first rope section is an adjustable loop formed within said first rope section.

3. The system as defined in claim 2 wherein said loop is formed by using a friction stop member.

4. A method for first rotating and second lifting a bicycle toward an overhead stationary surface, said method comprising the steps of:
affixing first and second pulleys to the overhead stationary surface;
affixing a third pulley to the axles of the bicycle;
affixing a first end of a rope segment to a crossbar on the bicycle;
adjusting the length of said rope segment between said crossbar connection to the bicycle and the first of said first and second pulleys;
passing said rope segment around said first of said first and second pulleys, around said third pulley and thence around said second of said first and second pulleys;
applying a force to the second end of said rope segment.

5. An object lifting system comprising:
a first pulley;
a second pulley;
a third pulley;
a rope segment arranged to pass over said first pulley, under said second pulley and over said third pulley, said rope segment having four portions, including:
a first portion extending from the object to said first pulley;
a second portion extending from said first pulley to said second pulley;
a third portion extending from said second pulley to said third pulley; and
a fourth portion extending from said third pulley;
means for attaching said second pulley to the object;
means for attaching said first and third pulleys to an overhead member;
means for forming a loop in said first portion of said rope segment;
whereby when the fourth portion of said rope segment is pulled in a generally downward direction, so that said rope segment is in tension, said second pulley moves upwardly until said second pulley is substantially even with said means for forming a loop in said first portion of said rope segment which first rotates the object and said second pulley and said means for forming a loop in said first portion of said rope will then move upwardly at the same rate which lifts the object in its rotated position toward the overhead member.

6. The system as defined in claim 5 wherein the means for forming a loop in said first portion of said rope segment is a friction stop member.

7. The system as defined in claim 6 wherein said friction stop member is substantially circular and has three pairs of oppositely disposed holes passing therethrough.

8. The system as defined in claim 7 wherein the angle of rotation of the object may be determined by adjusting the position of the loop in said first portion of said rope segment.

9. The system as defined in claim 7 wherein the center line of the outer pair of holes in said friction stop member is angularly disposed from the long axis of said friction stop member.

10. The system as defined in claim 9 wherein the angular disposition of said friction stop member creates additional friction force on said rope segment passing therethrough.

11. A method for first rotating and then lifting an object including the steps of:
mounting first and second pulleys to an overhead stationary member;
mounting a third pulley to the object to be lifted;
connecting a first end of a rope segment to the object to be lifted;
passing said rope segment around said first pulley, around said second pulley and around said third pulley;
forming a loop within that portion of said rope segment between its connection to the object to be lifted and said first pulley;
positioning said loop between the object and the overhead stationary, member;
whereby when the free end of said rope segment is pulled in a substantially downward fashion the object to be lifted will be first rotated through an angle determined by the position of said loop between the object to be lifted and the stationary member and then lifted in its rotated position.

12. The system as defined in claim 11 wherein said loop is formed by the use of a friction stop member.

13. The system as defined in claim 12 wherein the friction between the said rope segment and said friction stop member determines the array of forces placed on the object to be rotated and then lifted.

* * * * *